Aug. 18, 1925.  1,550,240
R. C. BROWNE
ELECTRICAL MEASURING INSTRUMENT
Filed Oct. 10, 1921   2 Sheets-Sheet 2

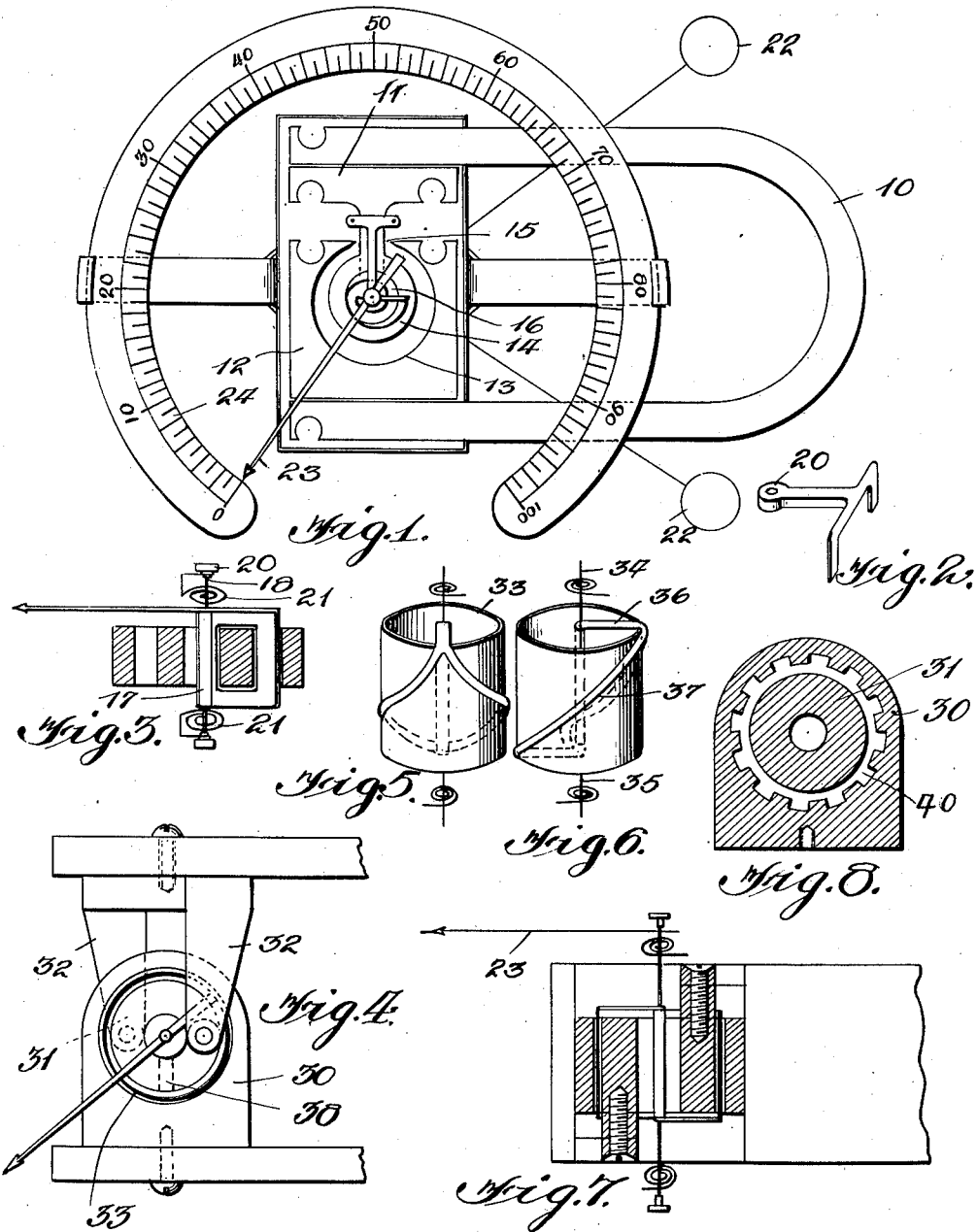

Inventor
Ralph C. Browne

By
Attorney

Patented Aug. 18, 1925.

1,550,240

UNITED STATES PATENT OFFICE.

RALPH C. BROWNE, OF SALEM, MASSACHUSETTS.

ELECTRICAL MEASURING INSTRUMENT.

Application filed October 10, 1921. Serial No. 506,924.

*To all whom it may concern:*

Be it known that RALPH C. BROWNE, citizen of the United States, residing at Salem, in the county of Essex and State of Massachusetts, has invented certain new and useful Improvements in Electrical Measuring Instruments, of which the following is a specification.

This invention relates to improvements in electrical measuring instruments, and more particularly to that type of instrument employing a pointer associated with a scale and operated by the movement of a coil of wire positioned within a magnetic field, such, for example, as an ammeter.

One of the objects of the present invention is to provide an improved electrical measuring instrument of the above general character provided with an unusually long and open scale whereby greater efficiency and accuracy in the operation of the instrument may be obtained.

Another object of the invention is to provide an instrument of the above character having a uniform scale.

A further object is to provide an instrument of the above character whereby a large amount of damping can be obtained.

A still further object is to provide an electrical measuring device of exceedingly simple and durable construction which may be readily manufactured and assembled, as well as one which is relatively inexpensive, and can be depended upon to remain in perfect working condition.

Other objects will be in part obvious from the annexed drawings and in part indicated in connection therewith, in the following analysis of the invention.

This invention accordingly consists in the features of construction, the combination of parts, and in the unique relation of the members and in the relative proportion and disposition thereof, all as more completely outlined herein.

To enable others skilled in the art fully to comprehend the underlying features thereof, in order that they may embody the same in numerous modifications in structure and relation contemplated by this invention, drawings depicting preferred forms have been annexed as part of this disclosure, and in such drawings like characters of reference denote corresponding parts throughout all of the views, of which—

Figure 1 shows a plan view of one form of instrument embodying the present invention;

Figure 2 is a detail perspective view of one of the pivot supports;

Figure 3 is a sectional detail view showing the coil and its relation to the pole pieces;

Figure 4 is a fragmentary view showing a modification:

Figures 5 and 6 are views at right angles to each other, showing the coil and drum used in the mechanism shown in Figure 4.

Figure 7 shows a sectional view of the coil and pole pieces shown in Figure 4;

Figure 8 is a detail sectional view showing a still further refinement of the invention by which additional damping is secured;

Figure 9:
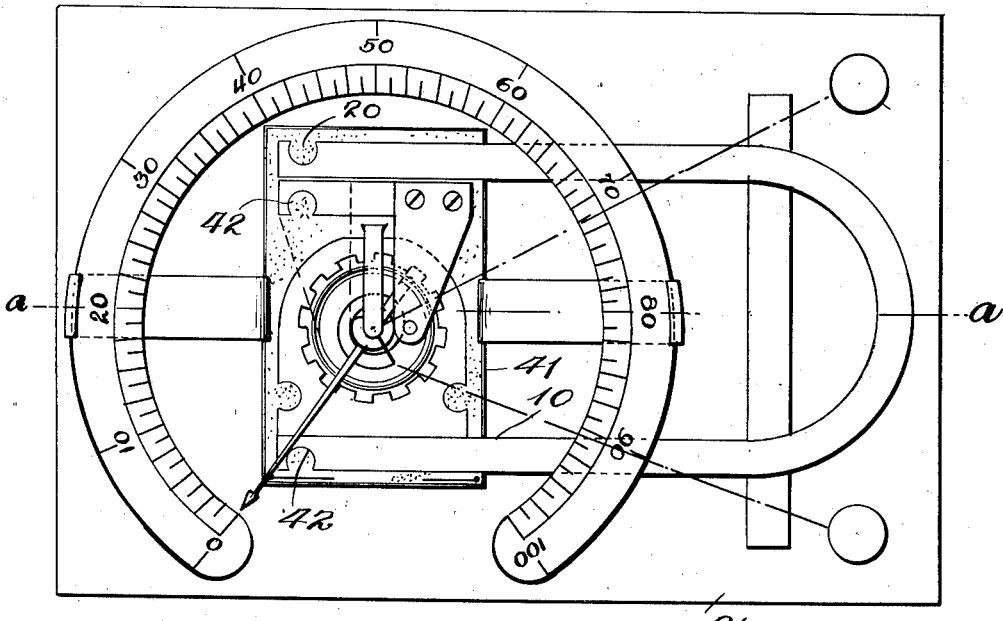
Figure 9 is a plan view of the complete instrument using the pole pieces shown in Figure 8.

Referring now to the drawings in detail, and more particularly to Figure 1, 10 indicates a magnet of general U-shape or horseshoe construction provided with pole pieces 11 and 12. The pole piece 12 is provided with a central opening 13 which surrounds a part 14 of the pole piece 11, extending through a gap 15 in the pole piece 12, as clearly shown. This opening or space 13 between the parts 12 and 14 of the pole pieces constitutes a strong magnetic field. The central part of the pole piece 14 is provided with an opening 16 within which is mounted a part of a coil 17, shown more in detail in Figure 3. The opposite sides of this coil are provided with suitable pivots 18 co-acting with bearings 20, shown in Figure 2. Suitable hair springs 21 convey the current from binding posts 22 into the windings of the coil 17, and also give a certain amount of control over its movements.

From the above, it will be seen that one side of the coil 17 is pivoted in the center of the pole piece member 14, while the opposite side of the coil passes through the space 13 between the two pole parts 12 and 14, whereby, when a current is passed through the coil, the lines of force passing between the two poles are cut and a variation in the current passing through the coil will cause the coil to turn in a well known manner about its central or neutral pivot and indicate, by means of a pointer 23 upon a suitable scale 24, the amount of current passing therethrough. It has been found in this construction that if the pole piece 14 is placed absolutely central with regard to the part 12, the reluctance of the metal of the pole pieces 12 and 14 will create an uneven strength of magnetic field in the space 13 therebetween. It is, therefore, preferable to place the part 14 slightly off center, or dispose it eccentrically with respect to the opening in the part 12, the effect of this being to increase the lines of force at the point where they would normally be weaker, owing to the reluctance of the metal as stated. This results in the movements of the coil being practically uniform and the scale may, therefore, be made uniform and similar at every point.

In this construction, it will also be noted that something over half the weight of the coil 17 is at one side of the axis and, therefore, the system is slightly unbalanced. By placing the pointer 23 directly opposite the unbalancing portion of the coil, this unbalancing is to a certain extent counter-acted, but such construction necessitates an unnecessarily heavy pointer, and consequently slightly decreases the efficiency of this type, so that it is not as accurate in measuring very small currents. This objection, however, may be overcome by the preferred embodiments hereinafter described.

The space 13 between the two pole parts is preferably made comparatively wide in order to have sufficient space for the coil 17 to freely turn. This coil ordinarily comprises a plurality of layers of wire. I prefer, however, that this coil should be wound upon a copper or metal frame, the movement of which, by the action of the coil, produces a certain amount of damping by reason of its cutting the lines of force in the gap or space 13.

In Figure 4, there is shown a modification of the invention, particularly where the mounting of the pole pieces and the shape of the coil are concerned. This construction has a much greater efficiency and accuracy by overcoming certain slight defects above outlined. The pole piece 30 completely surrounds the pole piece 31, the latter being supported at opposite sides by means of brackets 32, as shown clearly in Figures 4 and 7. These parts 30 and 31 are substantially concentrically disposed and the lines of force between the two parts are approximately equal at all points. The space between these two parts may be made relatively smaller than that shown in Figure 1, thereby obtaining a much stronger field.

The movable member used in connection with this form of magnet is shown in Figures 5 and 6, and preferably consists of a metallic cylinder 33 having the wire of the coil distributed over its external surface as shown, and passing back through the center. The wire, 34, at one end of the coil, enters from one side and the wire returning at 35 at the other end of the coil. The coil, while passing through the center and across the end of the cylinder, is bunched, as indicated at 36, so as to occupy as little space as possible. The portion of the coil on the surface of the cylinder, however, is spread out at 37, and divided into two sections, as shown in Figure 5, one going to the right around the coil and the other to the left. In a winding of this character, it will be seen that the current in passing from one end of the coil makes what is practically a complete circuit of the coil, that is, it follows the circumference of the cylinder. It will be noted, also, that the coil is provided with suitable pivots or terminals for the wires 34 and 35, which may be mounted in brackets or supports, as shown in Figure 2, as well as the conducting hair springs 21. A pointer 23 coacts with the scale in substantially the manner above described.

In Figure 4 there is indicated, by dotted lines, a portion 38 of the inner pole piece 31 which is removable to allow the placing of the central portions of the coil in the interior thereof, thus contributing to the ease of assembling the parts.

The present device operates in substantially the same manner as that previously described. Movement of the coil 36 will cause considerable eddy currents to be generated in the metal cylinder 33, resulting in considerable damping. The wire passing from the top to the bottom of the coil, however, passes through the entire angular extent of the gap and the conditions of the magnetic field are averaged and it is unnecessary that the field should be uniform to secure uniform movement of the coil and the connected pointer. If desired, the pole pieces may be constructed in the manner shown in Figure 8. In this form, the pole piece 30 has its interior surface serrated or formed with a plurality of notches somewhat similar to an internal gear. This results in the field in the space 40, between the parts 30 and 31, being made up of a plurality of poles of maximum and minimum strength, the result being that the cylinder 33, moving in this space, has produced in it local currents of individual positive lines of force; that is, they are able to flow back and forth on the surface and, thereby greatly increase the damping factor, allowing the movement of a larger pointer to be utilized if desired.

In Figure 9, there is illustrated more completely the type of pole pieces used in Figure 8 and all being shown in proper relation to the coils, hair springs, pointer and scale.

Figure 10:
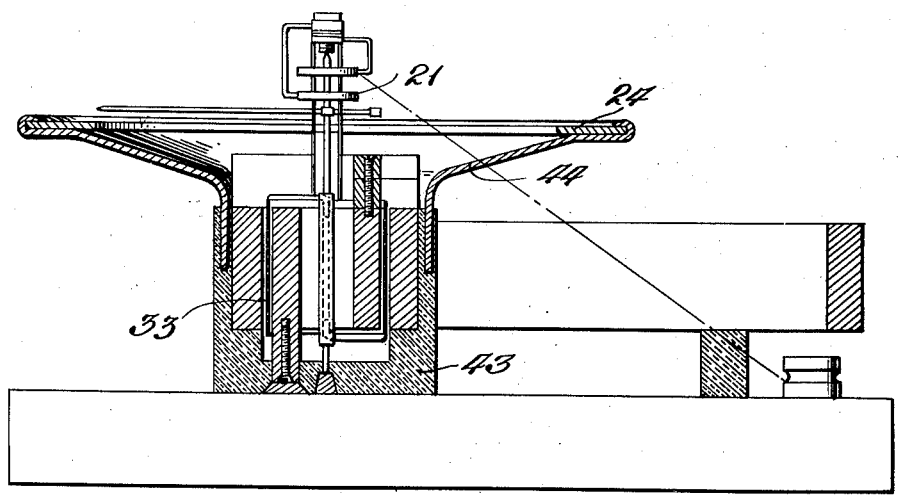
Figure 10 shows a sectional view taken substantially on the central longitudinal line of Figure 9.

In the construction of the several devices, it has been found that screws, bolts, etc., were not to be depended upon, as they were apt to give way under use, and, furthermore, take considerable time in assembly as well as increase the cost of construction. The complete device, as shown in Figure 9, has been found to give most permanent and satisfactory results. Preferably, there is employed a box 41 of brass, copper or other non-magnetic material, adapted to surround the ends of the magnet 10, as well as inclose the pole pieces secured thereto. Both the magnet and the pole pieces are provided with dove-tail openings 42 at various points, being properly held in place by suitable jigs. In constructing the finished article, I preferably fill the box with a suitable fusible material such as Wood's metal, which, upon hardening, holds all the various component parts in their proper relation and prevents their removal in the course of time except by express efforts. This material is shown, perhaps, better, in Figure 10, being indicated by the numeral 43. There is also embedded in this material supports 44 for holding the scale 24.

From the above, it will be seen that the present invention provides a simple and practical electrical measuring instrument having a relatively small number of parts which may be inexpensively manufactured and assembled. The peculiar construction of the pole pieces, that is, one interfitting within the other and providing a space within which the coil is mounted, permits the pointer carried by said coil to swing uniformly over a relatively wide arc upon which may be mounted a scale of uniform divisions. The device is not only durable, reliable, efficient and extremely accurate, but is also known to accomplish, among others, all of the objects and advantages herein set forth.

It will thus be seen, without further analysis of the invention, that the advantages and construction of this invention are set forth to such an extent as to enable others, by applying current knowledge, to readily adapt it for various applications without omitting certain features that from the standpoint of the prior art, constitute essential characteristics of the generic or specific aspects of this invention, and, therefore, such adaptations should and are intended to be comprehended within the meaning and range of equivalency of the following claims.

I claim:

1. In an electrical measuring instrument of the character described, in combination, two circular pole pieces having a substantially concentric relation to each other and providing a space therebetween having an electro-magnetic field, a coil having one part concentric with respect to the inner pole piece and having another part adapted to travel through the magnetic field, said latter part being helically disposed with relation to said pole pieces.

2. An electrical measuring instrument of the character described, in combination, a movable coil, supports for said coil, pole pieces in operative relation thereto and a cylinder, one portion of said coil being disposed on the surface of the cylinder and another portion of said coil being central of said cylinder, said pole pieces and supports being fixed in operative relation by a casting material.

3. In an electrical measuring instrument of the character described, in combination, a magnet, pole pieces associated with the ends of said magnet, a coil having an inactive portion and a helically disposed active portion adapted to turn with respect to the pole pieces, and supports for the coil, said magnet, pole pieces and supports being embedded and held in proper relative relation by casting material.

4. In an electrical measuring instrument of the character described, in combination, a movable coil, pole pieces in operative relation thereto, and a cylinder, one portion of said coil being disposed on the surface of the cylinder, and another portion of said coil being placed centrally within said cylinder.

5. In an electrical measuring instrument of the character described, in combination, a magnet having substantially concentric and interfitting pole pieces with an annular space therebetween, a coil mounted in said annular space, and a cylinder on the surface of which a portion of said coil is wound, the remaining portion of the coil lying substantially in the axis of the cylinder.

6. In an electrical measuring instrument of the character described, in combination, a magnet having pole pieces, a coil adapted to turn on the passage of electrical current within the field between the said pole pieces, said coil comprising an active portion and an inactive portion, said active portion comprising a bend at right angles to its length, and a portion helically disposed with relation to the same.

7. In an electrical measuring instrument of the character described, in combination, a magnet having pole pieces between which exists a magnetic field of uneven strength, a coil of wire adapted to move in said field, and a cylindrical support for said coil in which an inactive portion of said coil is arranged, said coil being so positioned in said field of uneven strength that its movement is substantially uniform, a portion of said coil being helically disposed on said cylindrical support.

8. In an electrical measuring instrument of the character described, in combination, a magnet having interfitting circular pole pieces forming a cylindrical magnetic field, a coil adapted to move through said cylindrical field and having an inactive portion, said coil being so related to said field that its points of entrance into and departure from said field are spaced in the direction of movement, of said coil.

9. In an electrical measuring instrument of the character described, in combination, a magnet having interfitting circular pole pieces providing an annular magnetic field therebetween, a coil adapted to move through said annular field, said coil having a portion thereof substantially coincident with the axis of one of said pole pieces, and another portion helically wound in the direction of movement of said coil.

10. In an electrical measuring instrument of the character described, in combination, a magnet having circular interfitting pole pieces providing a cylindrical magnetic field, and a moving coil associated with said field passing through the entire length of said field, the active winding of said coil comprising a bend at right angles to its length and a portion helically disposed with relation to its length.

11. In an electrical measuring instrument of the character described, in combination, a magnet having circular interfitting pole pieces providing a cylindrical magnetic field and a moving coil associated with said field passing through the entire width of said field, and a cylindrical non-magnetic member rotatably mounted within said cylindrical magnetic field on which said coil is mounted, said coil being so related to said field that its points of entrance into and departure from said field are spaced in the direction of movement of said coil.

12. In an electrical measuring instrument of the character described, in combination, a magnet having circular interfitting pole pieces providing a cylindrical magnetic field, and a moving coil associated with said field passing through the entire length of said field, a cylindrical non-magnetic member rotatably mounted within said cylindrical magnetic field, said coil being on said cylinder and comprising a plurality of wires extending equally in opposite directions from the top of one side of said cylinder to the bottom of the opposite side of said cylinder.

13. In an electrical measuring instrument of the character described, in combination, a magnet having pole pieces interfitting one within the other to provide a cylindrical magnetic field, said magnet and pole pieces being mounted in a box and being embedded in a suitable plastic material therein, a coil mounted to turn in a cylindrical field between said pole pieces said coil having active and inactive portions, a pointer carried by said coil, and a scale positioned above said box.

14. In an electrical measuring instrument of the character described, in combination, a magnet having pole pieces interfitting one within the other to provide cylindrical magnetic field, said magnet and pole pieces being embedded in a suitable plastic material, a coil mounted to turn in a cylindrical field between said pole pieces whereby said coil may be moved through an angle not less than 180°, a pointer carried by said coil, a scale, and members embedded in said plastic material supporting said scale.

In testimony whereof I affix my signature.

RALPH C. BROWNE.